Nov. 22, 1932.  H. S. ALEXANDER ET AL  1,888,754
BIAS CUTTING MACHINE
Filed June 15, 1928   4 Sheets-Sheet 1

INVENTORS:- HARRY S. ALEXANDER,
FRED B. PFEIFFER, & JOHN W. WHITE.
BY
ATTORNEYS

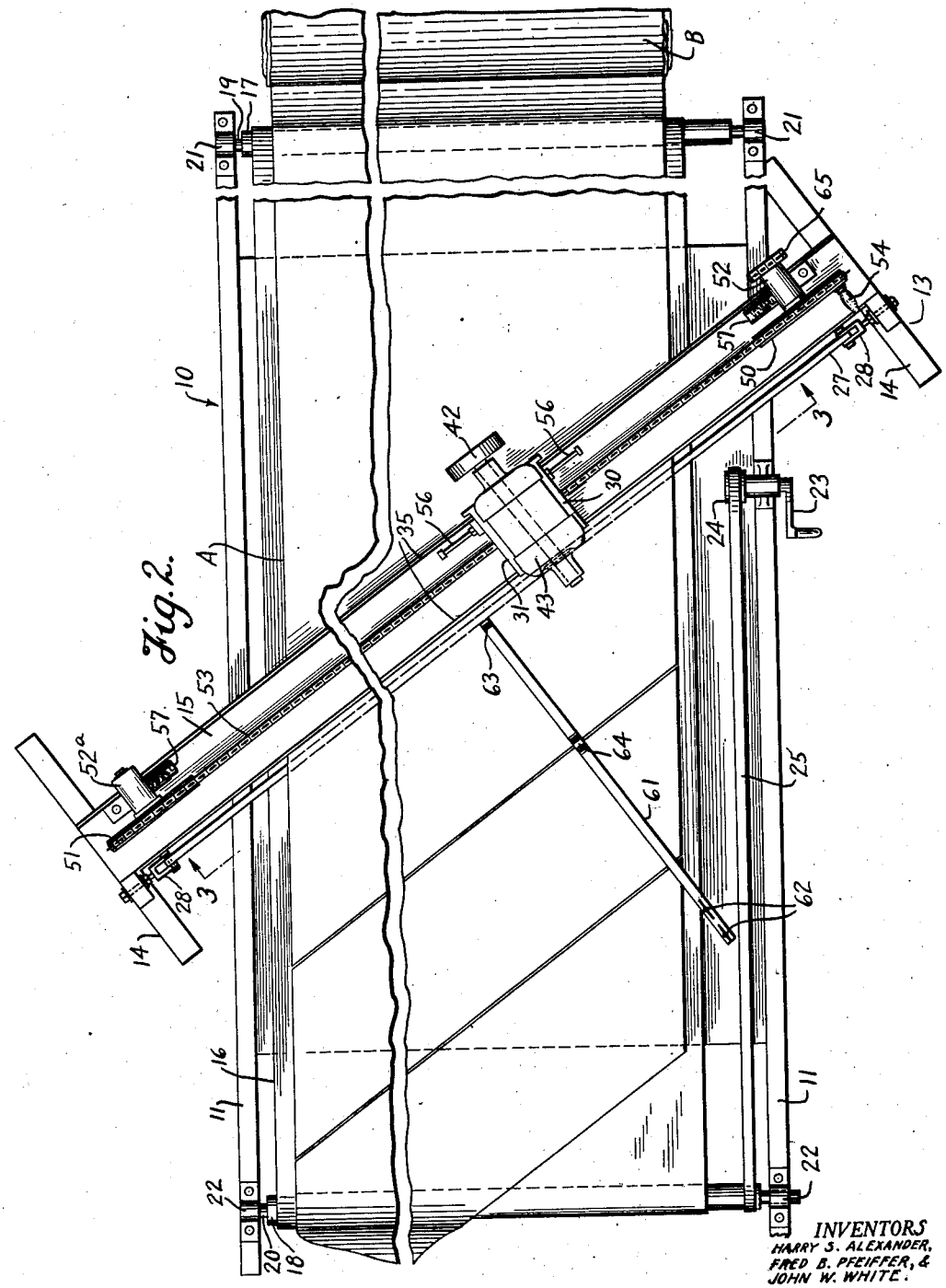

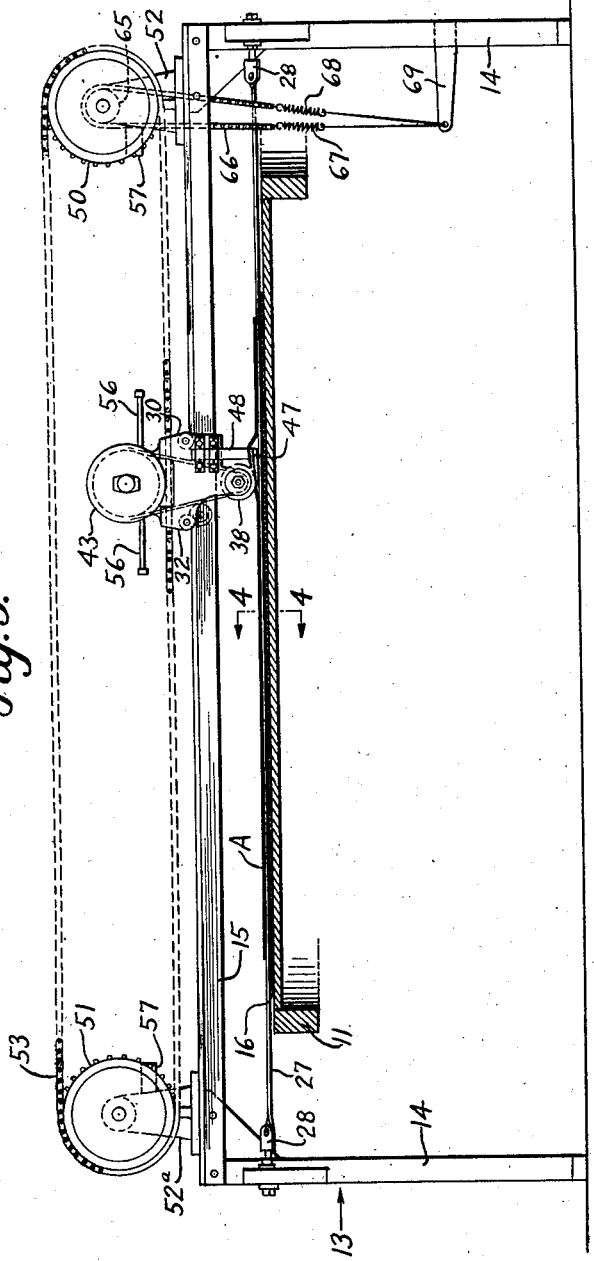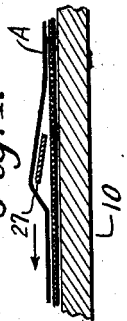

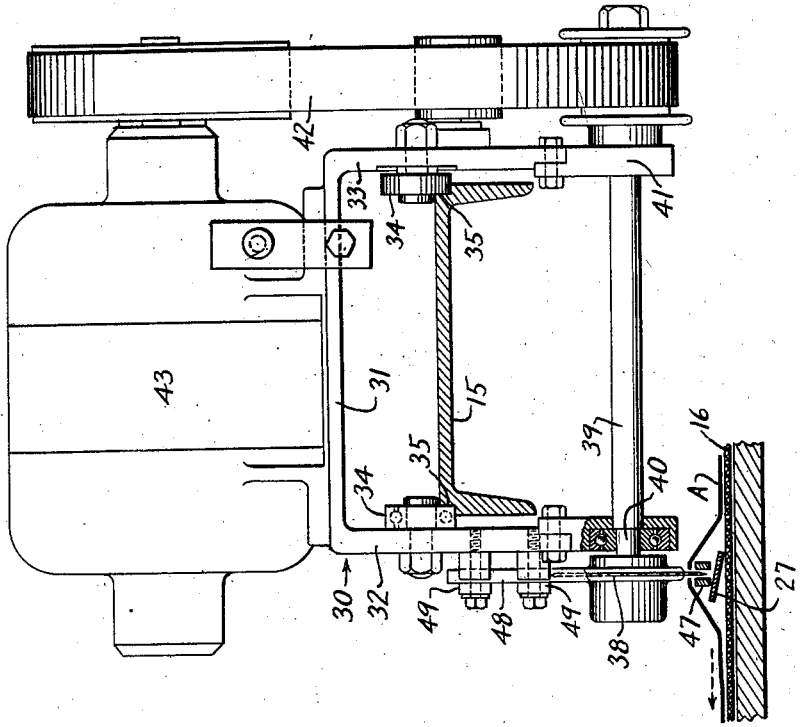
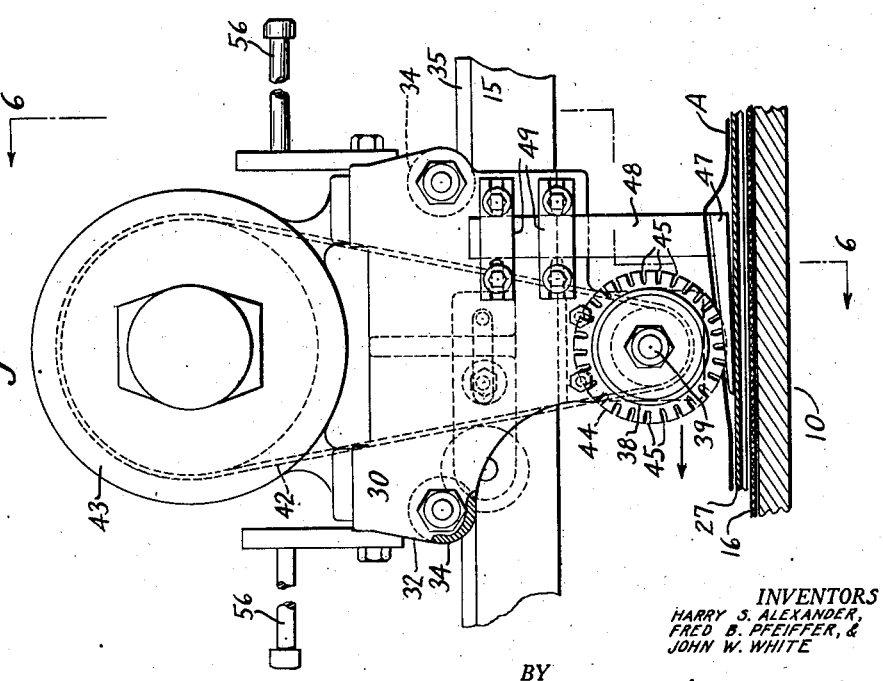

Patented Nov. 22, 1932

1,888,754

UNITED STATES PATENT OFFICE

HARRY S. ALEXANDER AND FRED B. PFEIFFER, OF AKRON, AND JOHN W. WHITE, OF BARBERTON, OHIO, ASSIGNORS TO SEIBERLING RUBBER COMPANY, A CORPORATION OF DELAWARE

BIAS CUTTING MACHINE

Application filed June 15, 1928. Serial No. 285,555.

This invention relates to improvements in machines for cutting sheet materials, and refers particularly to machines for cutting fabric materials on the bias.

In the manufacture of pneumatic tire casings, there is employed sheet rubber with reinforcing or load-bearing cords embedded therein, this material being arranged in different layers or plies and built to tire shape in green or unvulcanized condition upon a collapsible core or drum. Generally, the cords are arranged in two or more plies or layers and extend diagonally from bead to bead in opposite directions so as to cross each other in the adjacent plies, the number of plies depending upon the size of the casing, or upon the gauge of the cords, or both. In some cases, the cords in each ply or layer are cross-woven or made up in the form of a sheet of fabric or canvas for the production of "fabric tires", and in other cases the cords in each ply or layer are disposed merely side by side in parallel relation with no connection between them except the rubber with which they are impregnated or encased, for the production of "cord tires". In using the word "fabric" in the specification and claims, it is intended to comprehend either kind of sheet material above referred to or any other kind of sheet material embodying cords in one way or another to reinforce the rubber body portion.

The rubberized fabric above described is prepared in sheet form and wound, with a liner, in a stock roll and is later run thru a bias cutting machine which, as its name implies, cuts the sheet diagonally into strips with the cords disposed at the desired angle to the edges defined by the successive cuts. Prior to this invention, the bias cutting machines more generally in use have included jaws which automatically pick up the leading end of the fabric sheet and pull it a definite distance past an angularly disposed knife, by which the bias strip is cut as the jaws reach the limit of their motion. This feeding and cutting action is carried on intermittently at a speed of about eighty strips per minute, and the cut strips are individually placed between cotton cloth leaves of a book in which they are stored until used by the tire builder, or else they are spliced together end to end and wound up with a liner. These machines are very expensive and must be operated almost continuously to be at all economical. Moreover, they require from four to six attendants to operate them, with a consequent labor loss in all cases of delay due to mechanical break downs, bad stock, changing rolls, and other causes. In addition, the machines do not cut the bias strips with the desired accuracy, resulting in considerable waste of material, as well as imperfect construction of the tires in which the material is used.

The foregoing and other objectionable features of the prior art are overcome by the present invention, which has among its objects, the provision of a bias cutting machine of extremely simple construction, which will be economical, accurate, and efficient in use, and capable of being easily adjusted to vary the angle of the bias cut.

More specifically, the invention contemplates a bias cutting machine having a horizontally disposed endless belt conveyor which is manually operated to advance the fabric sheet material step by step and without tension from a stock supply roll to a cutting position where it is cut diagonally by a power-driven rotary cutter. This cutter is mounted upon a carriage which is reciprocable on a frame overlying the endless belt conveyor and extending transversely thereof at the desired angle, the frame being adjustable at will to vary the angle of the cut, and the carriage being caused to traverse the conveyor by manual rotation of a crank which turns a sprocket wheel operating a link chain to which the carriage is connected. Associated with the adjustable frame is a resilient metal strip or bar which extends across the conveyor immediately above the upper surface thereof and over which the fabric material is adapted to be fed. This strip or bar is positioned under the rotary cutter and serves to protect the endless belt, as well as to facilitate the traversing movement of the cutter. A guide shoe is also mounted on the carriage and has a bifurcated portion straddling the lower edge of the cutter, this shoe being wedge shaped and adapted to slide under the fabric with the aid of the resilient metal strip and to lift the same against the cutter during the cutting stroke of the carriage. On the return stroke of the carriage, the guide shoe passes over the fabric, leaving the same free to be fed forwardly preparatory to the next cut. A ruler or similar gauge is also adjustably mounted over the conveyor and disposed perpendicularly to the line of travel of the cutter, and by means of this gauge the operator can determine the exact amount of feeding movement of the conveyor to control the width of the successive strips.

The foregoing and other objects, features and advantages of the invention will be readily understood from the following description in connection with the accompanying drawings, wherein one embodiment has been shown by way of illustration, and wherein Fig. 1 is a perspective view of a bias cutting machine constructed in accordance with the invention;

Fig. 2 is a top plan view thereof;

Fig. 3 is a diagonal transverse sectional view thru the conveyor on line 3—3 of Fig. 2;

Fig. 4 is a fragmentary detail sectional view on a larger scale, on line 4—4 of Fig. 3;

Fig. 5 is an enlarged end view of the carriage and cutter, and showing more clearly the operation of the fabric lifting and guide shoe; and Fig. 6 is a side view of the carriage and associated parts, partly in section on line 6—6 of Fig. 5.

Figure 1:
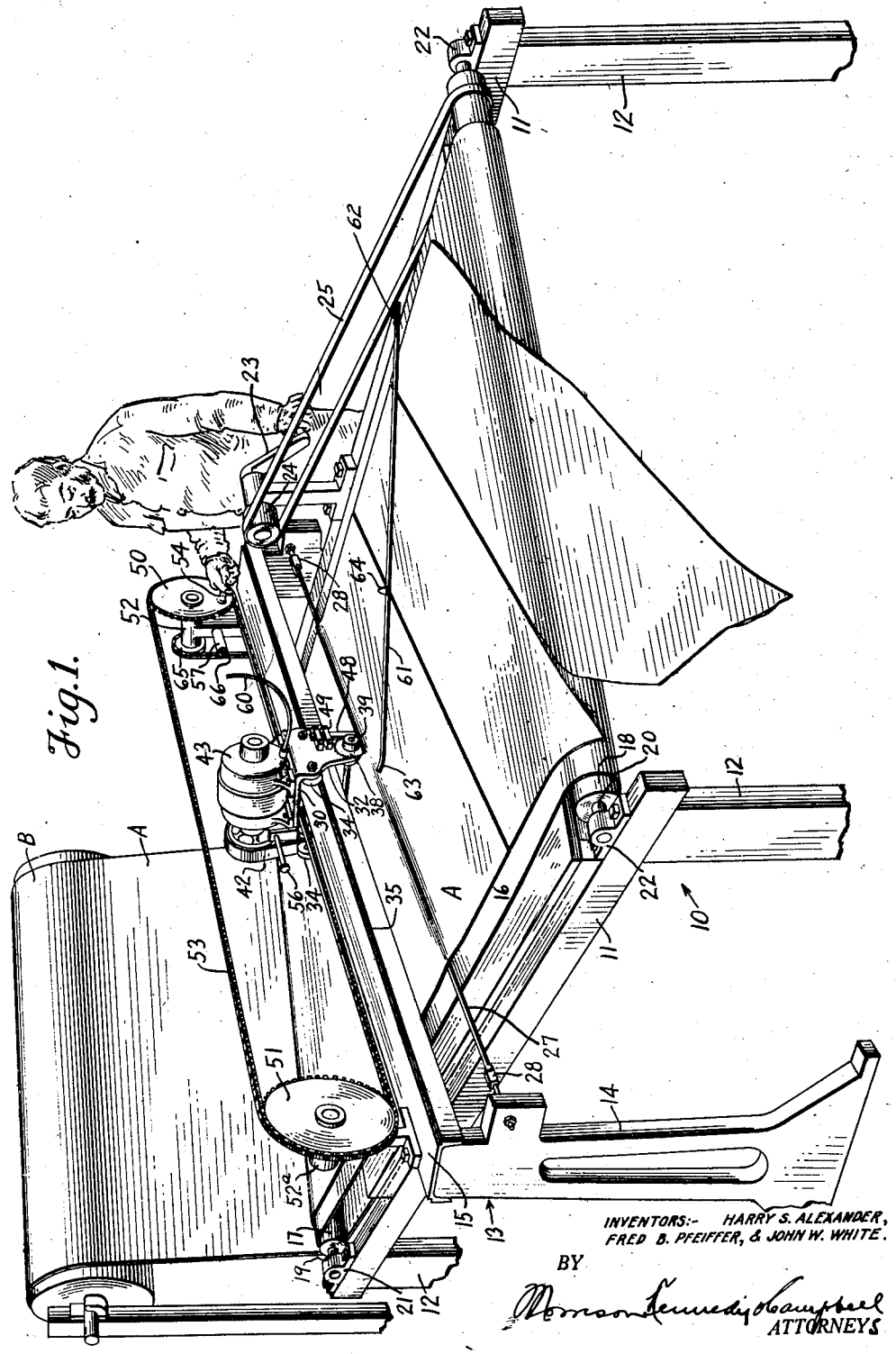

Referring in detail to the drawings, the improved bias cutting machine comprises a fixed main frame 10, having spaced parallel side rails 11 and supporting standards or legs 12, and a supplementary frame 13 which straddles the main frame 10 transversely and is adjustable angularly with reference thereto. The supplementary frame 13 comprises pedestals 14, arranged one at each side of the main frame, rigidly connected together by a structural steel channel member 15 which is spaced slightly above the main frame side rails 11 and capable of being shifted with the pedestals 14 as a unit, the arrangement being such that the channel member is disposed diagonally or obliquely with reference to the main frame. An endless belt conveyor 16 is supported by the main frame 10 to travel in a direction parallel with the side rails 11, the belt running over pulleys 17 and 18 on shafts 19 and 20 respectively, and these shafts being journaled at 21 and 22 adjacent the ends of the main frame side rails. The conveyor 16 is manually operated by a crank 23 which turns a pulley 24 connected by a belt 25 to the conveyor pulley 18, and by intermittently turning the crank 23, a rubberized fabric sheet A is fed forwardly step-by-step from a stock supply roll B to a cutting position below the supplementary frame 13.

The fabric sheet material to be cut lies upon the belt conveyor 16 and is fed without tension, and as it reaches the cutting position, it is caused to pass over a separator bar 27 whereby it is raised slightly from the conveyor belt (Fig. 4). This separator bar 27 is preferably in the nature of a thin flat strip of resilient metal which is slightly inclined in a transverse direction, as shown in Figs. 1, 4 and 6, and extends entirely across the main frame parallel with the channel bar 15. It is secured by means of screw yokes 28 to the pedestals 14 of the supplementary frame, whereby it can be adjusted with said frame to cut the material at different desired angles.

Mounted for reciprocation on the channel member 15 is a carriage 30, which comprises a substantially horizontal portion 31 and depending flange portions 32 and 33 respectively disposed at opposite sides of the channel member 15. Supporting rollers 34 are mounted on the inner faces of the flange portions 32 and 33 and travel in guides or grooves 35 adjacent the longitudinal edges of the channel member 15, thus facilitating movement of the carriage. A rotary cutter 38 is secured to one end of a shaft 39, which is journaled as at 40 and 41 in extensions of the flange portions 32 and 33, the shaft being driven by a belt and pulley arrangement 42 from an electric motor 43 on the carriage portion 31. The rotary cutter 38 is preferably formed of a thin circular metallic disc having its periphery 44 sharpened to a knife edge and provided with inwardly extending radial notches or incisions 45. It has been found that a cutter of this character does not become gummed, and is therefore more effective than a plain circular cutter.

The cutter rotates in a plane directly over the separator bar 27 and has associated with it a bifurcated wedge-shaped guide shoe 47 which is adapted to slide under the fabric and raise the same against the edge of the cutter. The guide shoe 47 is suspended from the carriage by a bar 48, which is vertically adjustable and held in position by clamps 49, and the fork portions of the pointed bifurcated end of the shoe are disposed at opposite sides of the lower edge of the cutter. As clearly shown in Figs. 5 and 6, the guide shoe has its lower surface slightly inclined longitudinally with reference to the separator bar 27, and this form of guide shoe in conjunction with the resilient nature of the separator bar will permit the cutter on its return stroke to pass over the fabric without injuring it or without interfering with its forward feeding movement. If desired the separator bar 27, instead of being arranged strictly horizontal, may be disposed at a downward inclination from the near to the far edge of the fabric, in which case, as will be apparent, the guide shoe will avoid contact with the separator bar except at the beginning of the cutting stroke. With such a downwardly inclined bar, the resilient property is not so important, altho even so it would be preferable to have the strip mounted for yielding at the near edge of the fabric in order that the guide shoe may more easily pass beneath the fabric.

In order to reciprocate the carriage 30, there is employed a pair of sprocket wheels 50 and 51 rotatably supported by suitable brackets 52 and 52ª adjacent the opposite ends of the channel member 15, said sprockets being connected by a link chain 53 to which the carriage is attached in any suitable manner. The sprocket 50 is provided with a crank handle 54 whereby it may be manually rotated by an operator standing at one side of the machine as shown in Fig. 1, rotation of the sprocket wheels in one direction causing the carriage to traverse the conveyor in a cutting stroke, and rotation of the sprocket wheels in a reverse direction causing the carriage to return to its original position adjacent the operator's station.

It is desirable to limit the stroke of the carriage and to relieve the chain 53 of shocks incident to reversal of movement, and for this purpose the carriage 30 is provided with a pair of oppositely extending studs or arms 56 which are adapted to abut against yielding stops or cushion members 57 supported by the brackets 52 and 52ª. Each of the yielding stops 57 includes a coil spring which is compressed by the corresponding stud 56 as the carriage reaches the end of its stroke, and the energy thus stored in the spring causes the carriage to rebound slightly, reducing the effort necessary for the next stroke.

In operating the device, the supplementary frame 13 is first adjusted to the proper angle desired, after which the sheet material A is fed forwardly on the conveyor by manual rotation of the crank 23, the carriage 30 then being at the side of the machine near the operator. As soon as the material has been advanced a sufficient amount beyond the path of the cutter, the operator stops turning the crank 23 and rotates the sprocket 50 by means of the handle 54 to start the cutting operation. The motor 43, supplied with current thru a flexible cord 60, operates continuously to rotate the cutter 38 at high speed by means of the belt 42. In the initial movement of the carriage 30, the pointed end of the guide shoe 47 rides on the resilient strip 27 and slides under the near edge of the fabric, and as the movement continues the fabric is lifted against the edge of the rotating cutter by which it is cut on a bias defined by the angularity of the frame 13. When the cut has been completed, the thick end of the guide shoe 47 passes the far edge of the fabric, and the travel of the carriage is quickly arrested either by the operator or by the abutment of the stud 56 with the cushion 57, whereupon the operator reverses the direction of rotation of the sprocket 50 to draw the carriage back toward him. As previously pointed out, the shoe 47 rides up over the fabric on this return stroke of the carriage and renders the cutter ineffective, so that the crank 23 is free to be manipulated to feed the material forward an amount equal to the width of the next strip to be cut. These operations can be repeated as often and as rapidly as desired, and because of the fact that the cutter is rotated at high speed, the cutting stroke can be effected very rapidly.

To enable the operator to measure the amount of material fed by the movement of the conveyor, and to gauge accurately the width of the strips to be cut, there is located at the delivery side of the conveyor a gauge bar or ruler 61 disposed perpendicular to the line of travel of the cutter, and having one end adjustably secured to the main frame side rail 11 as at 62 for endwise and swinging movement, and its other end 63 terminating at the line of cut, altho not necessarily so. The gauge bar overlies the conveyor 16 as best shown in Fig. 2, so that the cut strips are carried below it, and intermediate its ends the bar has an adjustable sight member or pointer 64, by which the amount of intermittent feed movement of the conveyor can be governed. Thus, after a cut has been made as previously described, the conveyor is operated until the line of the last cut registers with the sight member or pointer 64, at which time the conveyor is stopped and the next cut made. With this arrangement, the product of the machine is uniform in width and as a result, waste of material is reduced to a minimum.

In Fig. 3, another carriage arresting means is shown which may be used as an alternative for, or in conjunction with, the studs 56 and cushions 57. This means comprises a small sprocket 65 mounted for rotation with the carriage driving sprocket 50, and a piece of link chain 66 meshing with the sprocket 65. The ends of the chain 66 are secured to coil springs 67 and 68, respectively, the lower ends of which are anchored to a rigid arm 69 on the adjacent pedestal 14. As the sprocket 50 is rotated to reciprocate the carriage, the sprocket 65 is also rotated and, acting thru the chain 66, causes one or the other of springs 67 and 68 to be extended. The tension thus imposed on the springs assists in the reciprocation of the carriage, one spring acting on the cutting stroke and the other on the return stroke.

The improved bias cutting machine is not only of extremely simple construction and thus capable of being produced at low cost, but in addition it is most efficient in operation. The cost of operation is so small that the production of the machine can economically be regulated to suit the requirements of a group of tire builders, making it possible to supply them with fresh bias cut strips which may be used at once for the building of tires, thus improving the quality of the tires and eliminating the extra expense incident to handling and storing the strips in books or liner rolls. The machine can also be used to operate on different widths or thicknesses of fabric without making bothersome adjustments, and can be quickly and easily adjusted to vary the angle of the bias cut. Furthermore, bias strips of different widths may be cut without necessitating adjustment of the operative parts, since the operator has full control at all times of the amount of material fed forward in determining the width or widths of successive strips.

The invention is of course susceptible of numerous modifications in the details of construction and arrangement of parts, and the right is herein reserved to make such changes as fall within the scope of the appended claims without departing from the spirit of the invention.

Having thus described our invention, what we claim and desire to secure by Letters Patent of the United States, is as follows:

1. A bias cutting machine comprising a conveyor operable at will for advancing fabric step by step any desired amount from a source of supply to a cutting position, a carriage movable transversely back and forth over the fabric independently of the conveyor feed and intermediate the advancing steps thereof, and a power-driven rotary cutter mounted on said carriage and arranged to sever the fabric into successive bias-cut strips.

2. A bias cutting machine comprising a conveyor operable at will for advancing fabric step by step any desired amount from a source of supply to a cutting position, a carriage movable transversely back and forth over the fabric independently of the conveyor feed and intermediate the advancing steps thereof, a power-driven rotary cutter mounted on said carriage and arranged to sever the fabric into successive bias-cut strips, and means for varying the direction of movement of the cutter transversely over the fabric whereby to control the angle of the bias cut.

3. A fabric cutting machine comprising an endless belt conveyor for supporting fabric and advancing it step by step from a source of supply, a power-driven rotary cutter movable transversely over the fabric on the conveyor, means carried with the cutter for progressively lifting the fabric from the conveyor and presenting it to the edge of the cutter, and means for alternately advancing the conveyor and reciprocating the cutter whereby the fabric will be cut into successive bias strips.

4. A bias cutting machine comprising a conveyor manually operable at will for advancing fabric step by step from a source of supply to a cutting position without tension, a power-driven rotary cutter movable over the fabric and at an angle to the direction of feeding movement thereof, manually-controlled means for moving the cutter in a cutting stroke intermediate the advancing steps of the conveyor, and means associated with the cutter for progressively lifting the fabric from the conveyor and holding it against the edge of the cutter during the cutting stroke, whereby the fabric may be cut into successive bias strips of desired width with accuracy.

5. A bias cutting machine comprising an endless belt conveyor for supporting rubberized fabric and conveying it step by step to a cutting position without tension, a power-driven rotary cutter reciprocable transversely over the fabric to cut it intermediate the advancing steps of the conveyor, a tapered bifurcated shoe carried with the cutter and adapted progressively to lift the fabric up against the cutter, manually-controlled means for reciprocating the cutter independently of its power drive, and additional manually-controlled means for advancing the conveyor any selected amount whereby the fabric may be accurately cut into strips of desired width.

6. A bias cutting machine comprising an endless belt conveyor for feeding fabric in a straight run without tension, means for operating the conveyor intermittently to advance the fabric step by step to cutting position, a cutting instrument movable transversely over the conveyor and intermediate the ends thereof to sever the fabric into strips, means for effecting such movement of the cutting instrument while the fabric is at rest on the conveyor, and means separate and distinct from the cutting instrument and movable therewith for progressively lifting the fabric from the conveyor and holding it against the cutting instrument for severing the successive strips.

7. A bias cutting machine comprising, in combination, an endless belt conveyor for advancing fabric from a source of supply to a cutting position, a transversely extending frame disposed obliquely above the conveyor, a carriage reciprocable on said frame, a power-driven rotary cutter supported by the carriage, a separator strip disposed between the conveyor and the fabric at the cutting line, a shoe movable with the carriage to raise the fabric from the separator strip and against the periphery of the cutter, means for reciprocating the carriage, and means permitting intermittent operation of the conveyor independently of the carriage reciprocating means.

8. A bias cutting machine comprising, in combination, an endless belt conveyor for advancing fabric from a source of supply to a cutting position, a transversely extending frame disposed obliquely above the conveyor, a carriage reciprocable on said frame, a rotary cutter supported by the carriage, a separator strip disposed between the conveyor and the fabric at the cutting line said strip being transversely inclined away from the conveyor in the direction of movement of the fabric, and a bifurcated shoe depending from the carriage and movable therewith, said shoe being disposed immediately above the separator strip and having its fork portions at opposite sides of the lower edge of the rotary cutter, and being adapted to raise the fabric from the separator strip and against the cutter in the traversing movement of the carriage.

9. A bias cutting machine comprising, in combination, an endless belt conveyor for advancing fabric from a source of supply to a cutting position, a transversely extending frame located above and disposed at an angle to said conveyor, said frame being adjustable to different angles relative to the direction of movement of the conveyor, a carriage reciprocable on said frame, a rotary cutter supported by the carriage, a separator strip associated with the adjustable frame and adapted to be disposed between the conveyor and the fabric at the cutting line, a bifurcated shoe depending from the carriage and movable therewith, said shoe being disposed immediately above the separator strip and having its fork portions at opposite sides of the lower edge of the rotary cutter, and being adapted to raise the fabric from the separator strip and against the cutter in the traversing movement of the carriage, manually controlled means for operating the conveyor to feed the fabric forward, and means for reciprocating the cutter and carriage to produce the bias-cut strips.

10. A bias cutting machine comprising an endless belt conveyor for feeding fabric in a straight run without tension, a frame extending obliquely over said conveyor, a carriage reciprocable on said frame, a rotary cutter supported by the carriage to sever the fabric into successive bias-cut strips, and a gauge member overlying the conveyor and disposed perpendicular to the direction of movement of the cutter and carriage whereby to measure the width of the successive strips.

11. A bias cutting machine comprising an endless belt conveyor for feeding fabric in a straight run without tension, an adjustable frame extending obliquely over said conveyor, a carriage reciprocable on said adjustable frame, a rotary cutter supported by the carriage to sever the fabric into successive bias-cut strips, means for manually operating the conveyor intermittently to advance the fabric step-by-step, and additional means for manually reciprocating the carriage independently of the conveyor advancing means.

12. A bias cutting machine comprising an endless belt conveyor for feeding fabric in a straight run without tension, a frame extending obliquely over said conveyor, a carriage reciprocable on said frame, a rotary cutter supported by the carriage to sever the fabric into successive bias-cut strips, means for manually operating the conveyor intermittently to advance the fabric step-by-step, additional means for manually reciprocating the carriage independently of the conveyor advancing means, and resilient means for arresting the movement of the carriage at the ends of its strokes.

13. A fabric cutting machine comprising a fixed main frame, a substantially horizontal endless belt conveyor supported by said main frame for feeding fabric step-by-step in a straight run without tension, an adjustable frame extending obliquely over said main frame and conveyor, a carriage reciprocable on said adjustable frame, a motor-driven rotary cutter supported by said carriage and movable therewith, means associated with the carriage for raising the fabric against the periphery of the rotary cutter as it moves in one direction over the conveyor, and a gauge member adjustably mounted on the fixed frame, said gauge member overlying the conveyor and fabric at the delivery side of the cutting line and being perpendicular to the line of travel of the cutter, whereby to measure the width of successive bias-cut strips.

14. A fabric cutting machine comprising a fixed main frame, a substantially horizontal endless belt conveyor supported by said main frame for feeding fabric step-by-step in a straight run without tension, a supporting frame extending obliquely over said main frame and conveyor, a carriage reciprocable on said frame, a motor-driven rotary cutter supported by said carriage and movable therewith, manually controlled means for propelling the conveyor and the carriage independently, and a guide shoe depending from the carriage, said guide shoe being adapted to pass beneath the fabric on the cutting stroke of the carriage and above the fabric on the return stroke.

15. A fabric cutting machine comprising a fixed main frame, a substantially horizontal endless belt conveyor supported by said main frame for feeding fabric step-by-step in a straight run without tension, a supporting frame extending obliquely over said main frame and conveyor, a carriage reciprocable on said frame, a motor-driven rotary cutter supported by said carriage and movable therewith, manually controlled means for propelling the conveyor and the carriage independently, a resilient separator strip disposed between the conveyor and the fabric at the cutting line, and a wedge-shaped guide shoe depending from the carriage and having its lower end arranged to contact with the resilient separator strip, whereby the guide shoe is adapted to pass beneath the fabric on the cutting stroke of the carriage and above the fabric on the return stroke.

16. A bias cutting machine comprising an endless belt conveyor for advancing fabric step by step from a source of supply to a cutting position without tension, a reciprocating carriage supported to travel obliquely over the conveyor, a power driven rotary cutter suspended from said carriage and adapted to operate on the fabric to sever it into successive bias-cut strips intermediate the advancing steps of the conveyor, means for intermittently advancing the conveyor and reciprocating the carriage, and means movable with the carriage, but below the fabric, to lift the fabric from the conveyor and against the periphery of the cutter in performing the strip cutting action.

17. A bias cutting machine comprising an endless belt conveyor for advancing fabric step by step from a source of supply to a cutting position without tension, a reciprocating carriage supported to travel obliquely over the conveyor, a power driven rotary cutter suspended from said carriage and adapted to operate on the fabric to sever it into successive bias-cut strips intermediate the advancing steps of the conveyor, and manually controlled means for advancing the conveyor and for reciprocating the carriage independently of each other.

18. A bias cutting machine comprising a conveyor for advancing fabric step by step from a source of supply to a cutting position, means for operating the conveyor, a power-driven rotary cutter, a motor for driving the cutter, means for progressively lifting the fabric into the range of the cutter, a reciprocating carriage whereon the cutter, motor, and lifting means are mounted and operable while the fabric is at rest to cut the same into successive bias-cut strips, and means for reciprocating the carriage and its associated parts independently of the cutter-driving motor.

19. A bias cutting machine comprising a conveyor for advancing fabric without tension from a source of supply to a cutting position, means for manually operating the conveyor at will to advance the fabric step by step any desired amount with intermediate pauses, a power-driven rotary cutter movable transversely over the fabric in a diagonal line to sever the same into successive bias-cut strips, a reciprocating carriage wherein the rotary cutter is mounted, a fabric lifting shoe supported by the carriage and adapted to lift the fabric progressively against the cutter, and means for reciprocating the carriage independently of the cutter-driving means so as to effect the bias cutting operation while the fabric conveyor is at rest.

20. A bias cutting machine comprising a conveyor for advancing fabric from a source of supply to a cutting position, means for operating the conveyor intermittently to advance the fabric step by step with intermediate pauses, a power-driven rotary cutter movable transversely of the fabric on a diagonal line to sever the same into successive bias cut strips, a reciprocating carriage wherein the rotary cutter is mounted and operable to effect the bias cutting operation while the fabric conveyor is at rest, a separator strip disposed between the conveyor and the fabric at the cutting line, and a shoe movable with the carriage to raise the fabric from the separator strip and against the periphery of the cutter during the cutting stroke.

In testimony whereof, we have affixed our signatures hereto.

HARRY S. ALEXANDER.
FRED B. PFEIFFER.
JOHN W. WHITE.